United States Patent
Koga

(10) Patent No.: US 6,925,111 B2
(45) Date of Patent: Aug. 2, 2005

(54) DATA COMMUNICATION METHOD AND COMMUNICATION CONTROL APPARATUS

(75) Inventor: Mikio Koga, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 599 days.

(21) Appl. No.: 10/076,530

(22) Filed: Feb. 19, 2002

(65) Prior Publication Data

US 2002/0075977 A1 Jun. 20, 2002

Related U.S. Application Data

(63) Continuation of application No. PCT/JP99/06223, filed on Nov. 9, 1999.

(51) Int. Cl.[7] .............................. H04B 1/38; H04L 7/00
(52) U.S. Cl. ......................... 375/219; 375/360; 370/508
(58) Field of Search ................................ 375/219, 222, 375/226, 259, 356, 360, 369; 709/208, 209; 370/508; 710/58, 61; 210/58, 61

(56) References Cited

U.S. PATENT DOCUMENTS

| | | | | |
|---|---|---|---|---|
| 5,446,765 A | * | 8/1995 | Leger | 375/359 |
| 6,574,213 B1 | * | 6/2003 | Anandakumar et al. | 370/349 |
| 6,665,315 B1 | * | 12/2003 | Karasawa | 370/508 |
| 2003/0036361 A1 | * | 2/2003 | Kawai et al. | 455/69 |

FOREIGN PATENT DOCUMENTS

| | | |
|---|---|---|
| JP | 3-30595 | 2/1991 |
| JP | 4-833 | 1/1992 |

* cited by examiner

*Primary Examiner*—Young T. Tse
(74) *Attorney, Agent, or Firm*—Westerman, Hattori, Daniels & Adrian, LLP

(57) ABSTRACT

In data communication among a plurality of component units in an apparatus, transition state information corresponding to a state transition which has occurred in a sending side unit is sent to a receiving side unit in serial communication. In the receiving side unit, a state control signal is regenerated at the time when a given delay time has elapsed from the occurrence time of the state transition. Therefore, the state control signal can be sent in serial communication without any time skew. Also, in serial communication between the sending side unit and the receiving side unit, even if a control command signal is to be sent, in addition to the state control signal, a transition state information can be identified from the received signal, by means of adding identification information to the sending information.

8 Claims, 13 Drawing Sheets

PRIOR ART

DATA COMMUNICATION METHOD AND COMMUNICATION CONTROL APPARATUS

This application is a continuation of international application PCT/JP99/06223 filed Nov. 9, 1999.

TECHNICAL FIELD

The present invention relates to a data communication method among a plurality of units making up an apparatus, and to a communication control apparatus for that purpose.

BACKGROUND ART

As an apparatus-to-apparatus or an apparatus-constituent unit-to-unit data communication method, a traditional RS232C interface, which is a simple and start-stop synchronous type serial communication means, has widely being used.

However, as to a unit-to-unit data communication in an apparatus, a proper counter plan must be considered against events requiring real timing with less time skew (real-time events). Real time events mean, for example, in data communication between a main control unit and an input/output unit under the control of the main control unit, any trouble in the input/output unit, any change in a sensor contained in the input/output unit, driving of a motor contained in the input/output unit, etc. And, in the case when the main control unit directly controls the input/output unit, a state control signal corresponding to these real time events must be communicated between the unit-to-unit, without time skew. For this purpose, for instance, the main control unit and the input/output unit will be directly connected for every necessary signal (that is to say, a parallel connection of the number of signal lines).

FIG. 12 illustrates communication of the state control signal. In FIG. 12, a CPU 11 of a main control unit 10, a motor 24 and a sensor 25 of an input/output unit 20 are directly connected in parallel with the required number of signal lines (in the drawing, 4 signal lines, A, B, C and D). And, for example, a motor drive signal from the CPU 11 of the main control unit 10 is directly supplied to the motor 24 of the input/output unit 20, through the private signal lines A, B and C. Also, a detection signal from the sensor 25 of the input/output unit 20 is directly supplied to the main control unit 10, through the private signal line D. By these systems, the state control signal can be transferred without any time skew. Moreover, the motor drive signal or the detection signal is one of the state control signals.

In addition, the input/output unit 20 itself can control itself, mounting a MPU, which is a control means. However, even in this case, as the input/output unit controls itself based on a control command from the main control unit 10, a specified control command signal must be communicated between the CPU 11 of the main control unit 10 and the MPU of the input/output unit.

FIG. 13 illustrates communication of the control command signal. In FIG. 13, a parallel control command signal from the CPU 11 of the main control unit 10 is once stored in a control command sender register 121-1 connected to the CPU 11 with a bus. After that, the control command signal is converted into a serial signal by a P/S conversion data sender section 121-3, and sent to the input/output unit 20. The input/output unit 20 converts the serial signal into a parallel control command signal by a S/P convert data receiver section 122-3, and stores the converted data in a control command receiver register 122-1. After that, the control command signal is supplied to a MPU 21. The MPU 21 directly connects to a motor 24 and a sensor 25 in the unit. Also, the control command signal from the MPU 21 of the input/output unit 20 will be sent through the control command sender register (not noted in the drawing) and the P/S convert data sender section (not noted in the drawing) contained in the input/output unit 20, and supplied to the CPU 11 of the main control unit 10, through the S/P convert data receiver data section (not noted in the drawing) and a control command receiver register (not noted in the drawing). Thus, the control command signal is transferred unit-to-unit by serial communication.

DISCLOSURE OF THE INVENTION

It is therefore an object of the present invention to provide a data communication method and a communication control apparatus that can transfer a state control signal with no time skew, without unit-to-unit parallel connection in an apparatus.

Another object of the present invention is to provide a data communication method and a communication control apparatus that can transfer a state control signal with no time skew, using a serial communication of a control command signal.

In order to achieve the above objects, a data communication method of the present invention comprises the steps of detecting a state transition of a state control signal in a first unit; sending transition state information corresponding to the state transition from the first unit to a second unit; finding in the first unit a time difference between the occurrence time of the state transition and the sending time of the transition state information; sending delay time information on the time difference from the first unit to the second unit, following the sending of the transition state information; and regenerating the state control signal in the second unit, at the time when a given delay time has elapsed from the occurrence time of the state transition, based on the transition state information and the delay time information received in the second unit.

By this method, a state control signal can be sent in serial communication, without any time skew.

The data communication method of the present invention further comprises the step of sending control command information from the first unit to the second unit, wherein when the state transition has occurred while the control command information is being sent, the state transition information is sent after completion of the sending of the control command information.

By virtue of this, both of control command information and transition state information can be communicated by the same serial communication means. In this case, it is identified from identification information added to the received information whether the information received in the second unit is the control command information, the transition state information or the delay time information.

In the configuration of a communication control apparatus of the present invention to attain the above objects, the communication control apparatus for controlling serial data communication among a plurality of units that make up an apparatus, comprises a sending control part disposed in a first unit, the sending control part including a detection section to detect a state transition of a state control signal of the first unit; an operation section to find a time difference between the occurrence time of the state transition and the sending time of transition state information corresponding to the transition state; and a sending section to send the transition state information and delay time information on the time difference to the second unit; and a receiving control part disposed in a second unit, the receiving control part including a receive section to receive the transition state information and the delay time information sent from the first unit; and a regeneration section to regenerate the state control signal in the second unit, at the time when a given delay time has elapsed from the occurrence time of the state transition, based on the delay time information.

By this configuration, the state control signal can be sent in serial communication without any time skew.

Preferably, the sending control part further sends control command information to the second unit, and if the state transition occurs while the control command information is being sent, sends the transition state information after the completion of sending of the control command information.

By virtue of this, both of control command information and transition state information can be communicated by the same serial communication means. In this case, the sending control part adds information for identifying the control command information and the transition state information, to information to be sent, and the receiving control part identifies whether the received information is the control command information or the transition state information, in compliance with the identification information added to the received information.

BEST MODE FOR CARRYING OUT THE INVENTION

Embodiments of the present invention will now be described with reference to the drawings. It is to be noted however that the technical scope of the present invention is not restricted by these embodiments.

Figure 1:
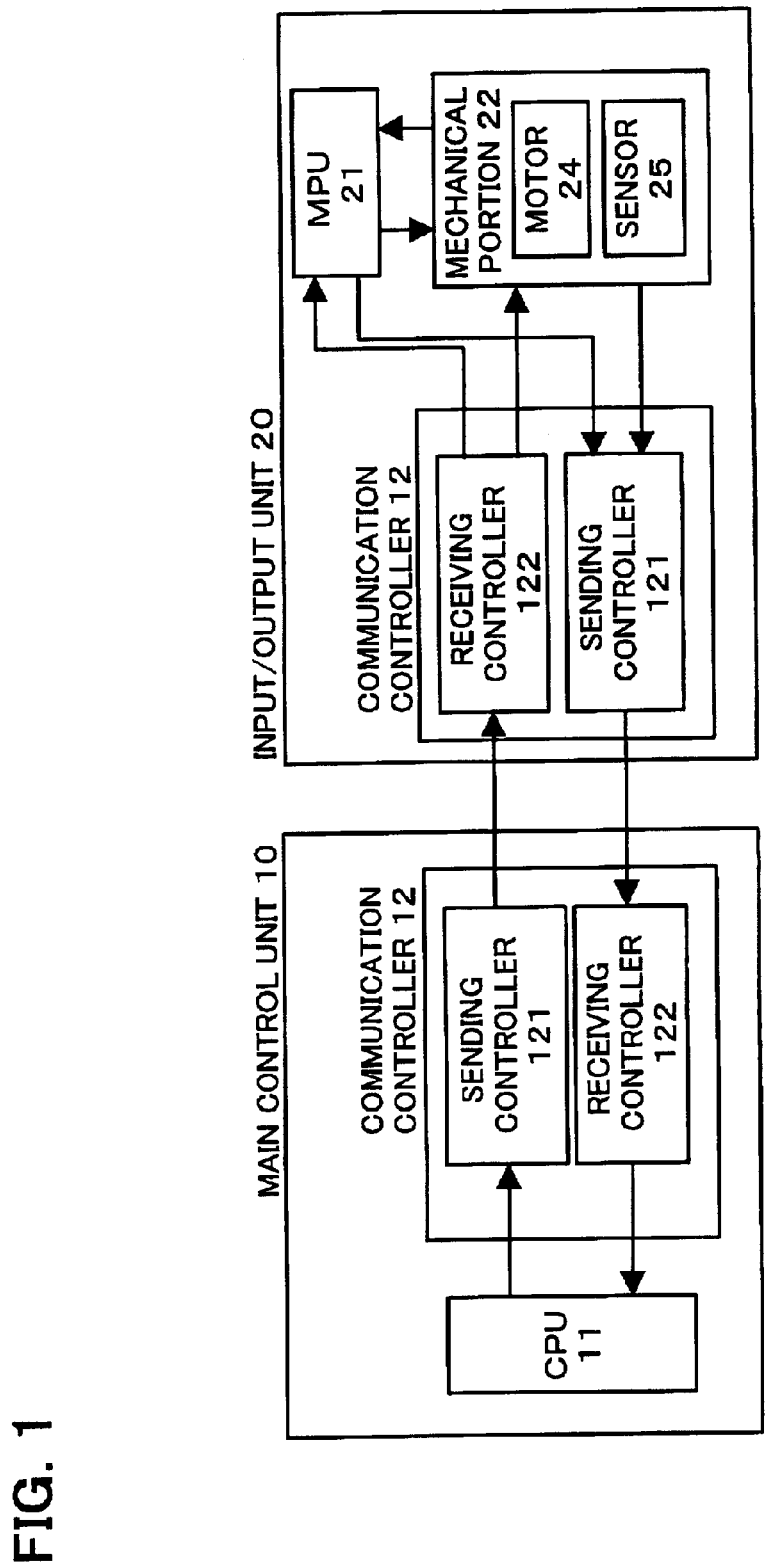
FIG. 1 shows an entire block configuration of units in an embodiment of the present invention.

FIG. 1 shows a total block configuration of units in an embodiment of the present invention. A main control unit 10 has a CPU 11 and a communication control section 12, and an input/output unit 20, which has a MPU 21, the communication control section 12 and a mechanism section 22. The mechanism section 22 has, for instance, a motor 24, a sensor 25, etc. Also, a communication control section 12 of the main control unit 10, and a communication control section 12 of an input/output unit 20 have, as described later, the same configuration, and each of these sections has a sending control section 121 and a receiving control part 122. Therefore, the main control unit 10 and the input/output unit 20 can concurrently perform the functions of both of a sending side unit and a receive side unit. In addition, the main control unit 10 can have a plurality of the communication control sections 12, and each of the communication control sections 12 of the main control unit 10 individually communicates with a different communication control section 12 of the input/output unit 20 (not noted in the drawing).

Description is made hereinbelow of configurations and operations of a sending control part 121 and a receiving control part 122 characteristic of the present invention.

Figure 2:
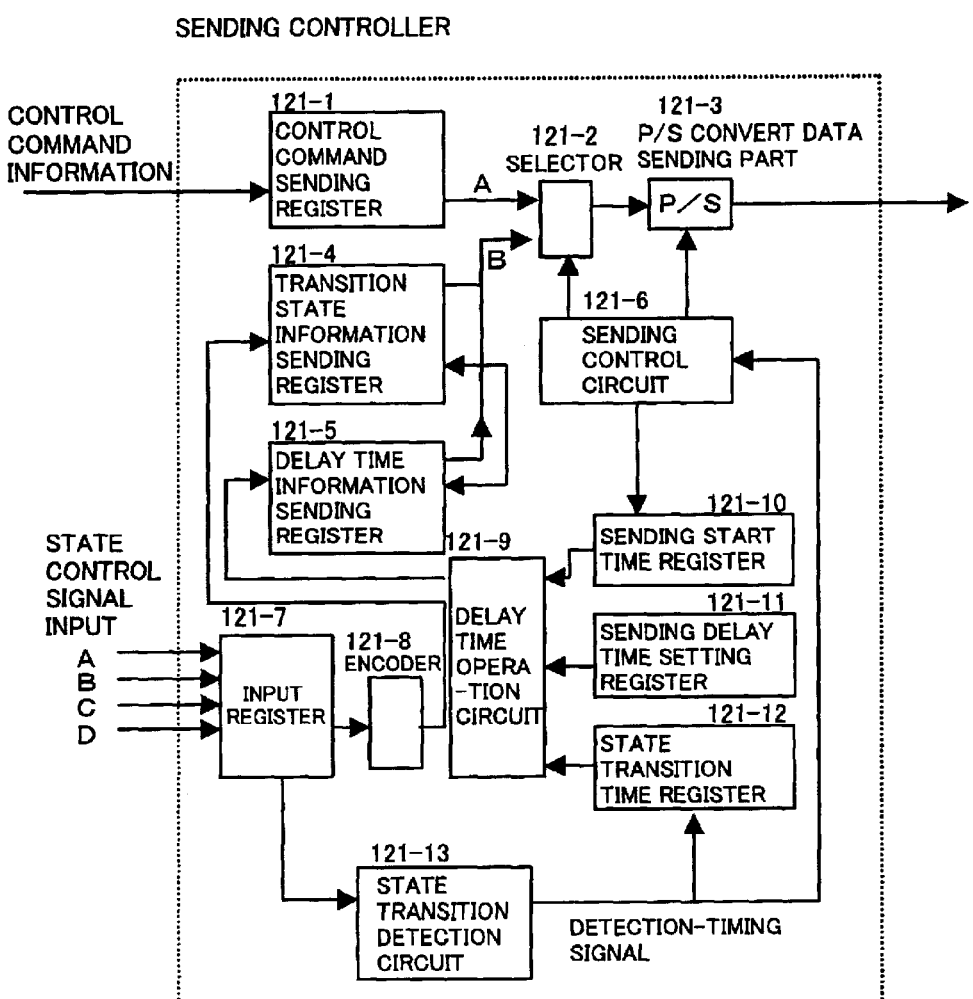
FIG. 2 shows a block configuration of a sending control section 121.

FIG. 2 shows a block configuration of the sending control part 121. In FIG. 2, a parallel control command signal from a CPU 11 or a MPU 21 is stored in a control command send register 121-1 as control command information. And, if a path A is selected by a selector 121-2, the control command information will be converted into a serial signal by a P/S convert data sending section 121-3 and outputted to a signal line SL. The sending control part 121 usually keeps the path A of the selector 121-2 open, and the control command information is sent through the P/S convert data sending section 121-3, once every specified sending cycle T.

On the other hand, a plurality of state control signals (for instance, 4 signals, A, B, C and D) is individually stored in an input register 121-7. And, when a state transition detection circuit 121-3 detects a change in a state control signal, the detection circuit outputs a detection-timing signal.

Figure 3:
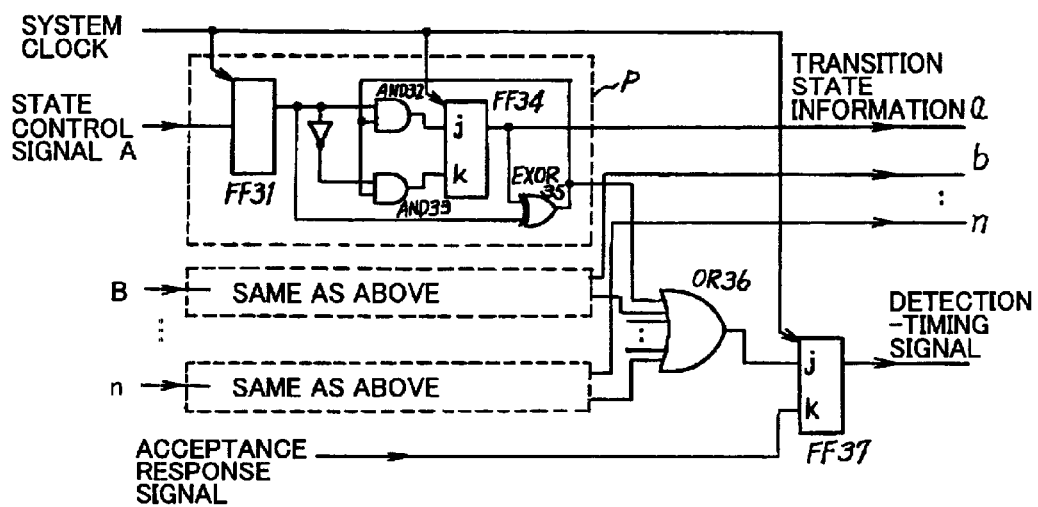
FIG. 3 shows an exemplary circuit that makes up an input register 121-7 and a state transition detect circuit 121-13.

FIG. 3 shows an example of a circuit making up the input register 121-7 and the state transition detection circuit 121-13. In FIG. 3, A P area as shown by the dotted lines is provided for the number of state control signals. At the area P, the state control signal A is inputted to a flip-flop FF31. The output of the FF31 is held by AND gates, AND32 and AND 33, and a flip-flop FF 34 as a sample, until the state control signal A changes. The output of the FF34 is outputted as a transition state information a. Moreover, the output of the FF31 and the output of the FF34 are inputted to an EXOR gate EXOR35, and if the both changed, in other words, if the state control signal changed, from the EXOR35, "1" is outputted from a JK flip-flop FF37, through an OR gate OR 36, as the detection-timing signal.

The detection-timing signal is inputted to a state transition time register 121-12 and a send control circuit 121-6. The state transition time register 121-12 stores a memory of the detection time of the change in the state control signal, based on the detection-timing signal. Also, based on the detection-timing signal, the send control circuit 121-6 stores the transition state information, which an encoder 121-8 encoded the state control signal stored in the input register 121-7, in a transition state information send register 121-4. Moreover, at the send control circuit 121-6, transition state information send request flag is set by the detection-timing signal.

When the send request flag is set, the send control circuit 121-6 waits until the sending cycle T at the P/S convert data sending section 121-3 ends, and shifts the path of the selector 121-2 to a path B by a select signal, which is described later. Then, the transition state information stored in the transition state information send register 121-4 interrupts the sending of the control command information, and, after being converted into a serial signal, will be sent from the P/S convert data sending section 121-3.

At this time, the sending time of the sent transition state information is stored in a sending start time register 121-10. And, a delay time operation circuit 121-9 performs the operation of:

$$\text{Delay time information } tr = \text{Set delay time } \tau - (\text{Sending start time } ts - \text{State transition time } tc) \quad (1).$$

The set delay time τ given in the equation (1) is the delay time to be set in advance, in a sending delay time setting register 121-11, and is longer than the sending cycle T of the control command information (for instance, 10 μs) The sending start time ts is a time to be stored in the sending start time register 121-10. Also, the state transition time tc is a time to be stored in the state transition time register 121-12.

The time difference (Sending start time ts–State transition time tc) in the equation (1) represents the actual delay period of time from the time when the state control signal, corresponding to the state transition, took place to the time when the signal is sent. Therefore, a delay time information is information indicating the difference between the set delay timeτ and the actual delay time (ts–tc).

The delay time information tr is stored in a delay time information send register 121-5. And, based on the control of the send control circuit 121-6, the delay time information tr stored in this register 121-5 is converted into a serial signal and sent, in the next cycle of the cycle when the transition state information tr was sent. When the delay time information tr was sent, the send control circuit 121-6 shifts the path of the selector 121-2 to the path A, and controls the sending of the control command information until it receives the detection-timing signal again.

Figure 4:
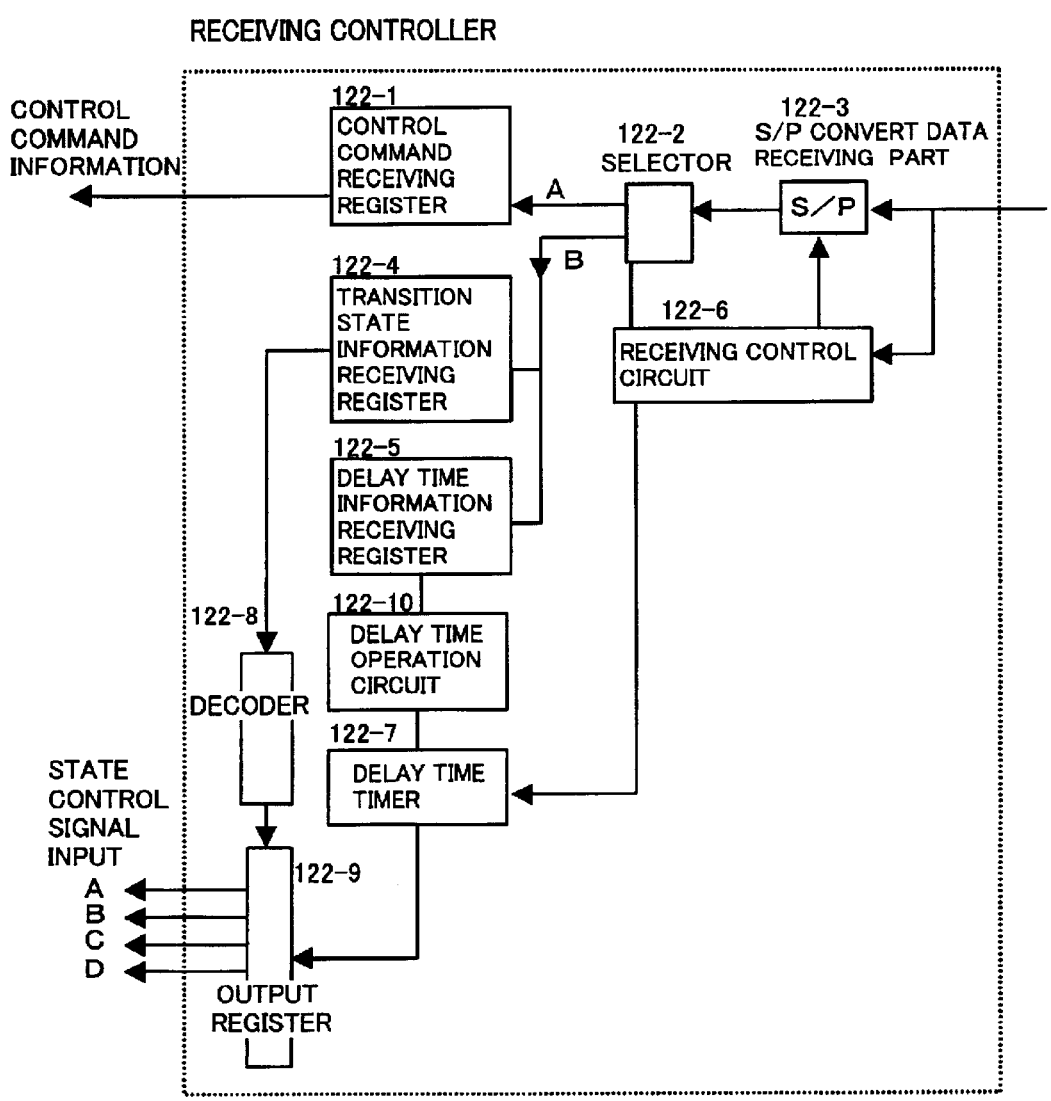
FIG. 4 shows a block configuration of a receiving control part 122.

FIG. 4 shows a block configuration of a receiving control part 122. A serial signal sent from a sending control part 121 is received by a S/P convert data receive section 122-3, and converted into a parallel signal. The received signal is inputted to a selector 122-2. And, according to the control of a receive control circuit 122-6, if the received signal is a control command information, the path A is selected, and the control command information will be stored in a control command receive register 122-1. Also, if the received signal is a transition state information or a delay time information, the path B is selected, and these information will be stored in a transition state information receive register 122-4 or a delay time information receive register 122-5, respectively. How to identify the specific type of the received signal at the receive control circuit 122-6 (whether the received signal is a control command signal, transition state information or a delay time information) will be described later.

The delay time information stored in the delay time information register 122-5 is supplied to a delay time operation circuit 122-10. The delay time operation circuit 122-10 sets for a delay time timer 122-7, the time obtained when a specified data transfer time is subtracted from the delay time information. The receive control circuit 122-6 turns ON the delay time timer 122-7, based on the receipt of the delay time information following the transition state information. And, the delay time timer 122-7 counts the set time. When the time is up, the delay time timer 122-7 outputs a time up signal. And, the transition state information stored in the transition state information receive register 122-4 is decoded through a decoder 122-8, and stored in the output register 122-9 as the state control signal. And, based on the time up signal, the state control signals (A, B, C and D) are outputted from the output register 122-9.

As described above, according to the embodiment of the present invention, a state transition taking place at a sending side unit will be regenerated at a receiver side unit after a given delay time elapsed. In other words, on a sending side unit, a state control signal inputted to an input register 121-7 of a communication control section 121 at a certain time will be sent to a receiver side unit in serial communication. And, on the receiver side unit, the signal will be outputted from an output register 122-7 of a receiving control part 122, after a preset given delay time elapsed. Therefore, according to the data communication method under the present invention, a state control signal can be sent without any time skew in serial communication. Also, by serial communication between a sending side unit and a receive side unit, even if in the case where a control command signal is to be sent, in addition to the state control signal, the data communication method under the present invention can be applied. In this case, a transition state information is identified from the received signal, and a state control signal is regenerated after a given delay time elapsed.

Figure 5:
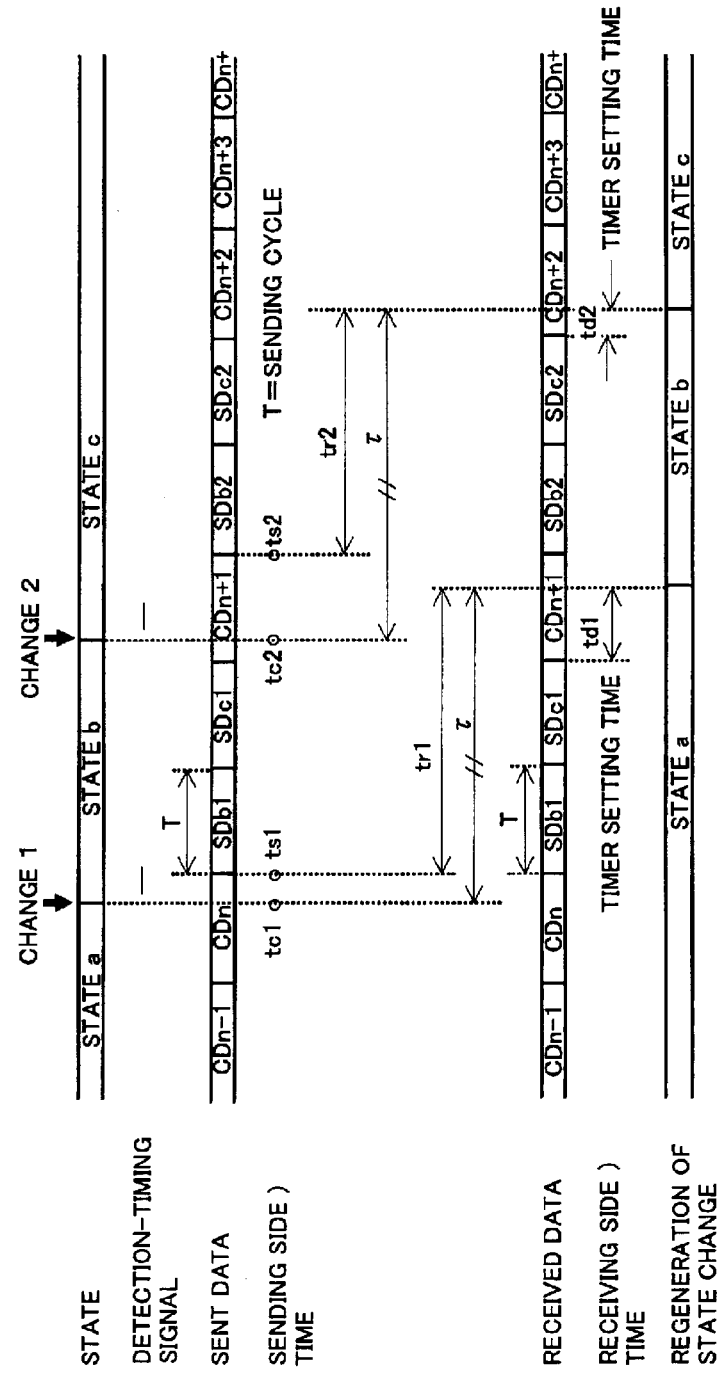
FIG. 5 is an explanatory diagram of a regeneration timing of a state control signal.

FIG. 5 illustrates a regeneration timing of a state control signal. In FIG. 5, such a case is assumed that when the state changes from a state a to a state b, and further changes to a state c. At the time when the state changes, as the value of whichever one of the plurality of the state control signals (for instance, signals A, B, C and D) would change, a detection-timing signal will be generated. In addition, the control command information to be sent in the sending cycle T at a time is denoted by CDn, and the transition state information by SDbn, and the delay time information by SDcn (n denotes an integer in any case).

On a receive side unit, change 1 from a state a to a state b took place at the time tc1, the sending of the control command information is in progress. Therefore, the sending of the transition state information SDb1 corresponding to the change 1 starts at the time ts1 when the sending of the CDn ends. Following the transition state information SDb1, the sending of the delay time information tr1=(τ–(ts1–tc1)) SDc1, operated at the delay operation circuit 122-9, starts at the time ts1+T when the transition state information SDb1 is sent.

The receipt of the transition state information SDb1 on the receive side unit completes at the time ts1+T, and the receipt of the delay time information SDc1 completes at the time ts1+2T. According to the present invention, the transition state information SDb1 is always regenerated after a given delay time elapsed from the state change time tc1. Because of this, for the delay time timer 122-7, time td1=(τ–(ts1–tc1)–2T) will be set. By this setting, the transition state information SDb1 is regenerated at the receive side unit after the set delay time τ elapsed from the time tc1 when the change took place. As to the change 2, the same can be said as described above. That is to say, the sending of the transition state information SDb2 corresponding to the change 2 taking place at the time tc2 starts at the time ts2 when the sending of the CDn+1 ends. Following the transition state information SDb2, the sending of the delay time information tr2=(τ–(ts2–tc2)) SDc2 starts at the time ts2+T when the transition state information SDb2 is sent.

The receipt of the delay time information SDb2 on the receive side unit completes at the time ts2+T, and the receipt of the delay time information SDc2 completes at the time ts2+2T. And, for the delay time timer 122-7, the time td2=(τ–(ts2–tc2)–2T) is set. Therefore, also in this case, the transition state information SDb2 is regenerated on the receive unit side, when the set delay time τ elapsed from the time tc2 when the change took place.

As described above, even if a state change taking place at the send side unit takes place in whichever timing of sending the control command information, the state change will always be regenerated at the receive side unit when a given delay time elapsed. In other words, the state control signal can be transferred without any time skew.

Figure 6:
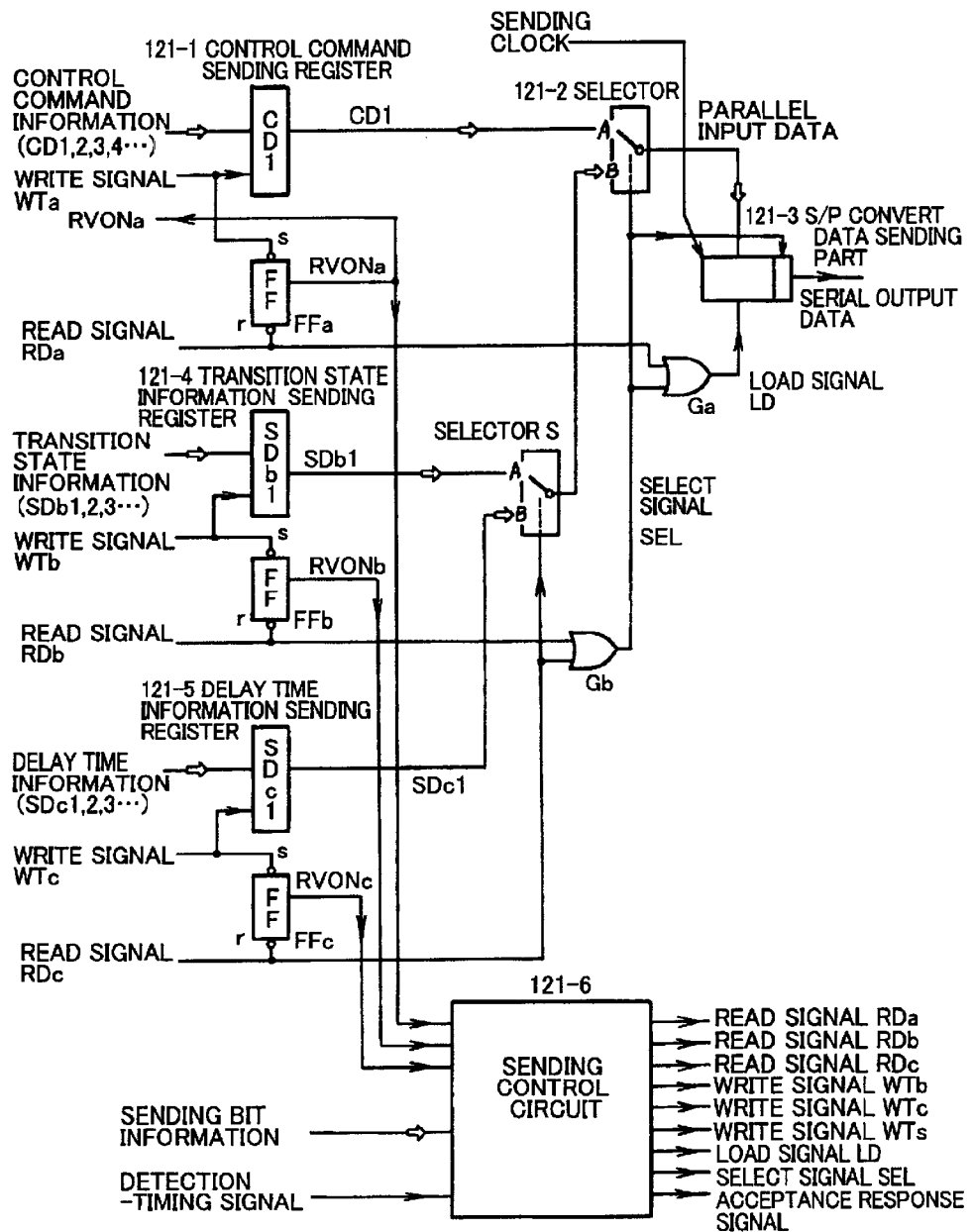
FIG. 6 is an explanatory diagram of an operation of the sending control section 121.
Figure 7:
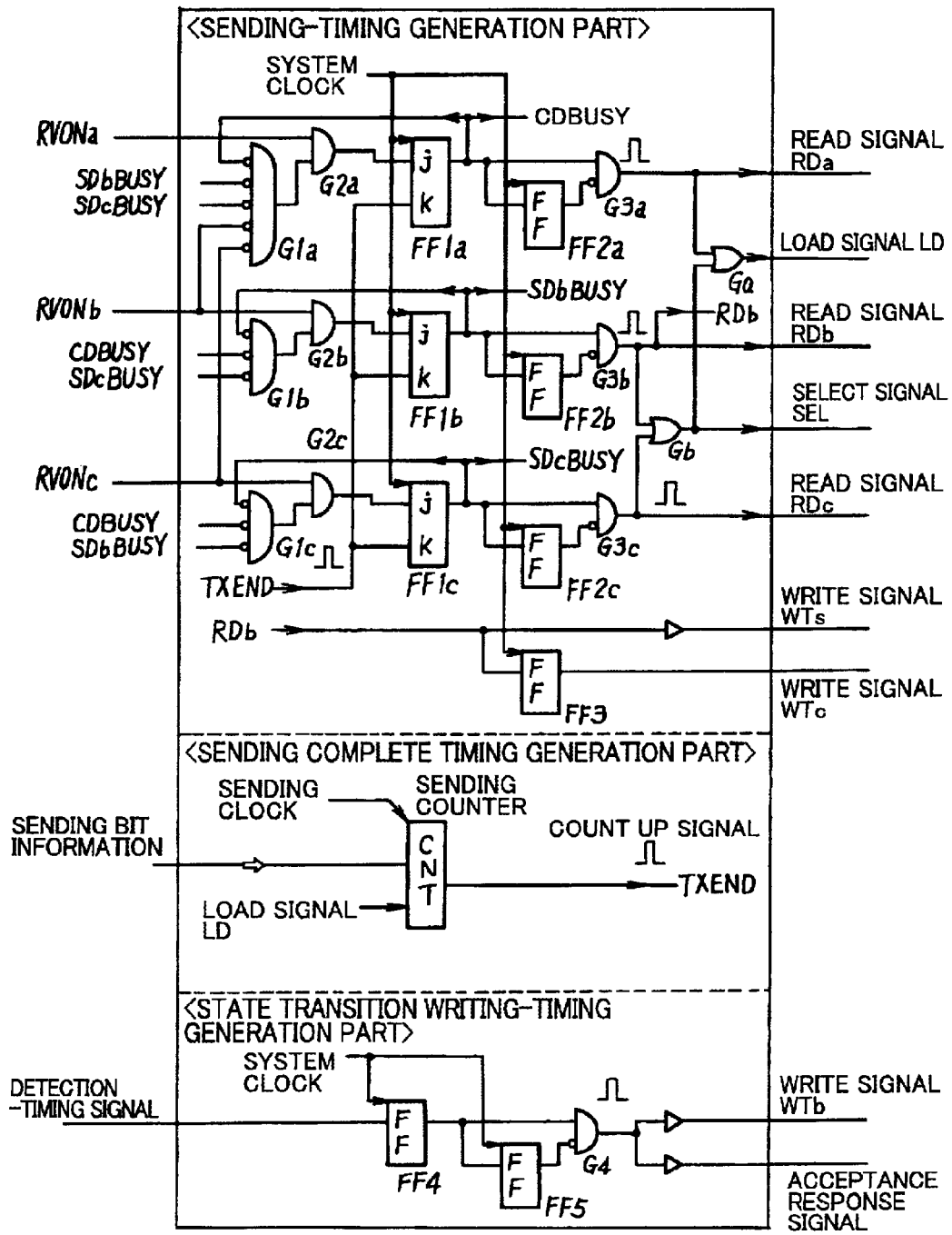
FIG. 7 shows an exemplary circuit configuration of a sending control circuit 121-6.

FIG. 6 illustrates the operation of a sending control part 121. And FIG. 7 shows an example of a circuit configuration of a send control circuit 121-6. The following shows further detailed description about the operation of sending control command information, transition state information and delay time information, depending on a variety of control signals from the send control circuit 121-6, with reference to FIGS. 6 and 7.

(1) Sending of Control Command Information

In FIG. 6, a CPU or a MPU outputs a control command information CD and a write signal Wta. A first control command information CD1 is stored in a control command send register 121-1, by the write signal Wta. And, the write signal Wta sets a flip-flop FFa, an accessory of the send register 121-1. By this setting, a receipt complete signal RVONa is outputted from the FF1. In other words, the value of the receipt complete signal RVONa will become "1". This receipt complete signal RVONa is fetched into the CPU or the MPU, and prevents the next control command information CD2 from being outputted from the CPU or the MPU, until the value of the receipt complete signal is reset (to "0") by a read signal RDa of the control command send register 121-1. And, the send control circuit 121-6 fetches the receipt complete signal RVONa as a send request.

In FIG. 7, a sending-timing generator section of the send control circuit 121-6 also fetches other send requests RVONb and RVONc. The signal RVONb is a receipt complete signal of the transition state information, and the signal RVONc is a receipt complete signal of the delay time information. Like the signal RVONa, in the case of both of the signals RVONb, and RVONc, and in FIG. 7, the value of a busy signal CDBUSY becomes "1", while the control command signal is being sent, and the value of a busy signal SDbBUSY becomes "1" while the transition state information is being sent, and the value of a busy signal SDcBUSY becomes "1" while the delay time information is being sent.

In FIG. 7, the receipt complete signal RVONa is inputted to an AND gate G2a. And, to the AND gate G2a, the output of an AND gate G1a is inputted. To the AND gate G1a, the reversed values of the signals CDBUSY, SDbBUSY, SDcBUSY, RVONb and RVONc are inputted. Therefore, when the value of whichever one of these signals is "1", in other words, while whichever one of the control command information, the transition state information or the delay time information is being sent, or when the transition state information or the delay time information is stored in each of the send registers 121-4 and 121-5, its reversed value becomes "0", and the output value of the AND gate G2a also becomes "0".

On the contrary, when the input values of the AND Gate G1a are all "1", in other words, when whichever signal of the control command information, the transition state information or the delay time information is not being sent, or when the transition state information and the delay time information are not stored in each of the send registers 121-4 and 121-5, the AND gate G1a opens, and the value "1" is outputted. Therefore, when the control command information CD is stored in the control command send register 121-1, and the value of the receipt complete signal RVONa becomes "1", the AND gate G2a opens, the value "1" is outputted. And the flip-flop FF1a is set. By this setting, the FF1a outputs a busy signal CDBUSY.

Moreover, a circuit comprising a flip-flop FF2a and an AND gate G3a shown in FIG. 7, makes up a differentiation circuit. And, from the AND gate G3a, differential pulse of rising of a busy signal CDBUSY is outputted, and this pulse signal is used as a load signal LD, through a read signal RDa, and further an OR gate Ga.

Referred back to FIG. 6, the read signal RDa resets the FFa. By this resetting, the receipt complete signal RVONa is cleared, and the value becomes "0". Therefore, the send register 121-1 is allowed to store the next control command information CD2.

In addition, a selector 121-2 selects a path A, by the value "0" of a select signal SEL to be outputted from an OR gate Gb, when the values of both of the read signals RDb and RDc are "0". And, by a load signal LD outputted from the OR gate Ga, a control command information CD1 to be stored in the control command send register 121-1 is loaded in parallel to a P/S convert data sending section 121-3 comprising a shift register, through the selector 121-2.

Moreover, by the load signal LD, the value "0" of the select signal SEL is loaded to the P/S convert data sending section 121-3 at the most significant bit. As described later, the most significant bit functions as identification information bit for identifying whether the sending signal is a signal of control command information, transition state information or delay time information.

The signal loaded in parallel is sequentially outputted from the P/S convert data sending section 121-3 as serial data, in synchronism with a sending clock.

The load signal LD further loads sending bit information to a sending counter CNT of a send complete timing generator section for the send control circuit 121-6. The sending bit information means the number of bits to be sent in the sending cycle T at one time. For instance, if the sending frame to be sent in the sending cycle T at one time comprises 1 start bit, 8 data bits, 1 ID information bit, 1 parity bit and 1 stop bit, 12 bits in total, the sending bit information is 12 bits. The sending counter CNT updates the counted value in synchronism with the sending clock. And, when the counted value of the clock agreed with the value of the loaded sending bit information, the sending counter CNT outputs a count up signal TXEND indicating completion of sending the data of the P/S convert data sending section 121-3. In the example as described above, the counter CNT outputs the count up signal TXEND once every 12 counts.

The count up signal TXEND resets a flip-flop FF1a. Then, the busy signal CDBUSY is cleared (output becomes "0"), and sending of the control command information CD1 completes.

(2) Sending of Transition State Information

In FIG. 6, when a detection-timing signal from a transition state detection circuit 121-13 is inputted to the send control circuit 121-6, the send control circuit 121-6 outputs an acceptance response signal to the write signal WTb and the state transition detection circuit 121-13. More specifically, in FIG. 7, the detection-timing signal sets a flip-flop FF4 of a writing-timing generator section of the send control circuit 121-6. A flip-flop FF5 and an AND gate G4 makes up a differentiation circuit as described above. And, from the AND gate G4, differential pulse of rising of the output of the FF4 is outputted, and the pulse signal is used as a write signal WTb and an acceptance response signal.

Referred back to FIG. 6, by the write signal WTb, a first transition state information SDb1 encoded by an encoder 121-8 is stored in a transition state information send register 121-4. At the same time, the write signal WTb sets a flip-flop FFb, an accessory of the send register 121-4. By this setting, a receipt complete signal RVONb with the value "1" is outputted from the FFb. The receipt complete signal RVONb is inputted to the send control circuit 121-6. Also, the signal RVONb is reset by a read signal RDb (reset to value "0").

In FIG. 7, the receipt complete signal RVONb is inputted to an AND gate G2b. To the AND gate G2b, the output of an AND gate G1b is inputted. To the AND gate G1b, the reversed values of signals CDBUSY, SDbBUSY, and SDcBUSY are inputted. That is to say, while the signal is being sent, as the value of whichever one of the inputs of the AND gate G1b becomes "0", the output value of the AND gate G1b becomes "0". Therefore, the output of the AND gate G2b also becomes "0".

On the contrary, when any signal is not being sent, the values of the inputs of the AND gate G1b become all "0". At this time, the AND gate G1b opens, and the value "1" is outputted. Therefore, when the value of the receipt complete signal RVONb is "1", the AND gate G2b opens, and the value "1" is outputted. And then, a flip-flop FF1b is set. By this setting, the FF1b outputs a busy signal SDbBUSY.

As described above, a circuit comprising a flip-flop FF2b and an AND gate G3b as shown in FIG. 7, makes up a differentiation circuit. And, from the AND gate G3b, differential pulse of rising of the busy signal SDbBUSY is outputted, and this pulse signal is used as the read signal RDb and a load signal LD.

In FIG. 6, the read signal RDb resets an FFb. By this resetting, the receipt complete signal RVONb is cleared, and the value becomes "0". By this clearing, the next transition state information SDb2 can be stored in the send register 121-4.

In addition, in FIG. 7, the read signal RDb is supplied to a sending start time register 121-10 as the write signal WTs. The sending start time register 121-10 stores the time when the write signal WTs was inputted, as the sending start time.

The selector 121-2 selects a path B, by the value "1" of the select signal SEL to be outputted from the OR gate Gb when the value of either of the read signals RDb or RDc is "1". And, by the load signal LD outputted from the OR gate Gb, the transition state information SDb1 to be stored in the send register 121-4 is loaded to the P/S convert data sending section 121-3 in parallel, through the path A of a selector S, and the path B of the selector 121-2. The selector S selects the path A by the read signal RDb, or selects the path B by the read signal RDc.

Further, by the load signal LD, the value "1" of the select signal SEL is loaded to the P/S convert data sending section 121-3 at the most significant bit, as the identification information. The signal loaded in parallel is outputted from the P/S convert data sending section 121-3 as a sequential serial data, in synchronism with the send clock.

In the same way as described above, the load signal LD loads a send bit information to a send counter CNT of a send complete timing generator section, and updates the counted value in synchronism with the send clock. And, when the counted value of the clock agrees with the value of the loaded send bit information, the send counter CNT outputs a count up signal TXEND indicating that the P/S convert data sending section 121-3 completes the sending of data.

The count up signal TXEND resets the flip-flop FF1b. By resetting, the busy signal SDbBUSY is cleared (output is cleared to "0"), and the sending of the transition state information SDb1 completes.

(3) Sending of Delay Time Information

In FIG. 7, a write signal WTc is generated from a read signal RDb, one clock later than a write signal WTs. To be more specific, the write signal WTc is an output signal from a flip-flop FF3 set by the read signal RDb.

In FIG. 6, by the write signal WTc, first delay time information SDc1 obtained by a delay operation circuit 121-9 is stored in a delay time information send register 121-5. At the same time, the write signal WTc sets a flip-flop FFc, an accessory of the send register 121-5. By this setting, a receipt complete signal RVONc with the value "1" is outputted from the FFc. The receipt complete signal RVONc is inputted to a send control circuit 121-6. Also, the signal RVONc is reset by the read signal RDc (the value is reset to "0").

The receipt complete signal RVONc occurs while the transition state information is being sent. Therefore, in FIG. 7, when the sending of the transition state information SDb1 completes, and the value of the busy signal SDbBUSY becomes "0", "1" is outputted from the AND gate G1c, and also "1" is outputted from the AND gate G2c. And then, a flip-flop FF1c is set. By this setting, the FF1c outputs a busy signal SDcBUSY.

As described above, a circuit comprising a flip-flop FF2c and an AND gate G3c shown in FIG. 7, makes up a differentiation circuit. And, from the AND gate G3c, differential pulse of rising of the busy signal SDcBUSY is outputted, and this pulse signal is used as the read signal RDc and the load signal LD.

In FIG. 6, the read signal RDc resets the FFc. By this resetting, the receipt complete signal RVONc is cleared to value "0". By this clearing, the next delay time information SDc2 can be stored in the send register 121-4.

Further in FIG. 6, same as described above, the selector 121-2 selects the path B. And, by the load signal LD outputted from the OR gate Ga, a delay time information SDc1 to be stored in a send register 121-5 is loaded to the P/S convert data sending section 121-3 in parallel, through the path B of a selector S and the path B of the selector 121-2. In addition, by the load signal LD, the value "1" of the selector signal SEL is also loaded as the identification information. The loaded signal is outputted from the P/S convert data sending section 121-3, as a sequential serial data, in synchronism with the send clock.

And, a count up signal TXEND outputted from a counter CNT, the flip-flop FF1c is reset. Then, the busy signal SDcBUSY is cleared to output "0", and the sending of the delay time information SDc1 completes. After the sending of the delay time information SDc1 completes, if the control command information CD in the waiting state is stored in the control command send register 121-1, processing returns to the steps as described in (1), and the control command information will be sent.

(4) Sending/Reception of Serial Data

Figure 8:
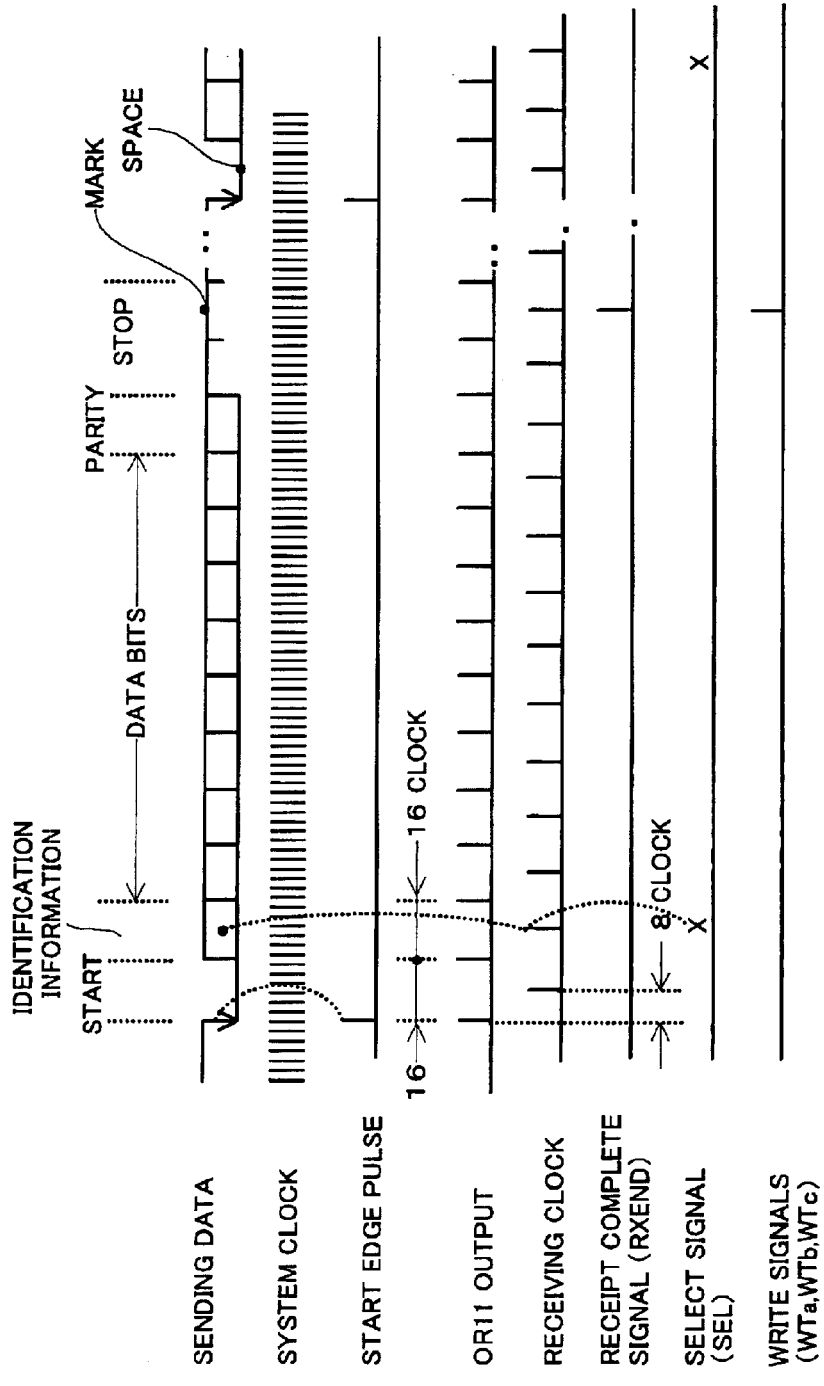
FIG. 8 is a timing chart of start-stop synchronous serial communication in the embodiment of the present invention.

FIG. 8 shows a timing chart for serial communication of a start-stop synchronization method in an embodiment of the present invention. In general serial communication of a start-stop synchronization method, the data of one word basically comprises: "start bit (1 bit)+data bit (7 or 8 bits)+parity bit (1 bit)+stop bit (1 or 2 bits)". It is decided that the start bit is space "0", and the stop bit is mark "1".

While in an embodiment of the present invention, to the data to be sent (received), identification information of one bit is added to identify the control command information, transition state information or the delay time information. That is to say, the data of one word in an embodiment of the present invention basically comprises: "start bit+ identification information bit+data bit+parity bit+stop bit". And, depending on the value ("0" or "1") of the identification information bit, the type of the received data is identified.

Further, the type of the received data can be identified, by means of setting a sending start command of the transition state information and the delay time information, to the control command information, and sending the transition state information and the delay time information, following the sending start command contained in the control command information, without identification information bit added to the sending (received) data. Also, the following FIGS. 9 and 10 describe about other signals noted in the drawings.

Figure 9:
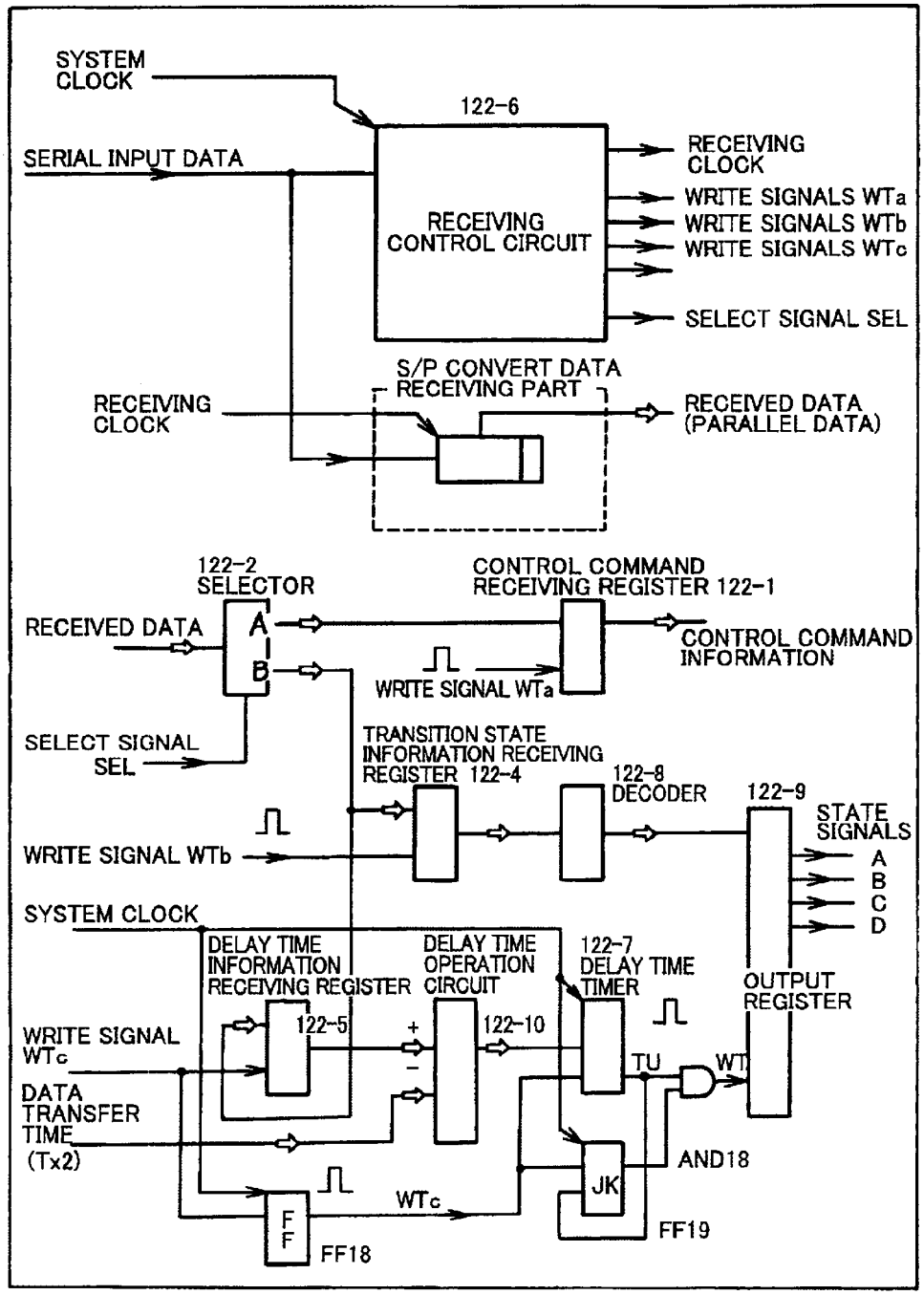
FIG. 9 is an explanatory diagram of an operation of the receiving control part 122.
Figure 10:
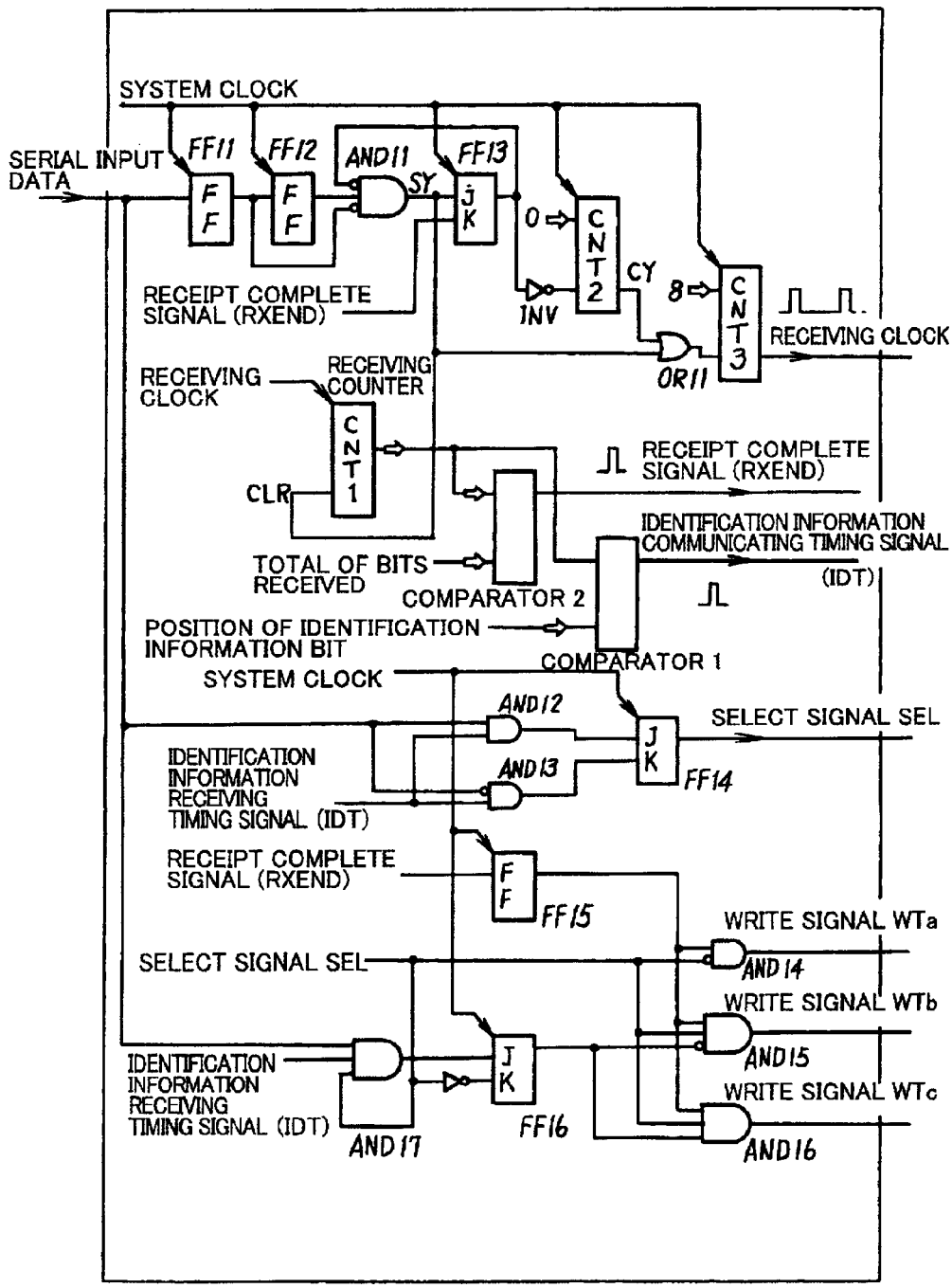
FIG. 10 shows an exemplary circuit configuration of a receive control circuit 122-6.

FIG. 9 illustrates the operation of a receiving control part 122. And, FIG. 10 shows an example of a circuit configuration of a receive control circuit 122-6. The following shows further detailed descriptions about the operation to receive a control command information, transition state information and a delay time information, following a variety of control signals from the receive control circuit 122-6, with reference to FIGS. 9 and 10.

(5) Reception of Control Command Signal

A serial data sent from a sending control part 121 is received by a S/P convert data receive section 122-3 of the receiving control part 122 and the receive control circuit 122-6. The receive control circuit 122-6 first of all, generates a receive clock, based on the receipt of the received data. Further detailed description about the generation of the receive clock is as shown below:

In FIG. 10, when the sending of the data (control command information, transition state information, or delay time information) from the sending control part 121 starts, first, the start bit "0" indicating the start of the data of one word is sent. Therefore, the value of bits of the received data to be inputted serially changes from the mark "1" to space "0" (see FIG. 8). This rise signal is detected by flip-flops F11 and F12, and an AND gate AND11, and a start edge signal SY is outputted from the AND gate AND11. By this start edge signal SY, a JK flip-flop FF13 is set to "1".

When the FF13 is set to "1", a counter CNT2 is released from the "loading" state, and functions as a 16-minutes cycle counter. In other words, the counter CNT2 outputs a count up pulse signal CY every time the counter counted a system clock 16 times. This count up pulse signal CY and the start edge signal SY are synthesized by an OR gate OR11, and inputted to a delay counter CNT3. The delay counter CNT3 generates and outputs a receive clock of 16 counting cycle, 8 counts later than the start edge signal SY.

The receive clock is supplied to the S/P convert data receive section 122-3 comprising a shift register. The S/P convert data receive section 122-3 sequentially fetches the data bits for one word, from the start bit to the stop bit in the received data to be inputted serially.

Also, in FIG. 10, a receive counter CNT1 is initialized to "0" by a start edge signal SY, and starts counting a receive clock. And, its counted value is supplied to comparators 1 and 2. The comparator 1 outputs identification information receipt-timing signal IDT, based on the comparison with the identification information bit position (the bit position in the data of one word). And, the comparator 2 outputs a receipt complete signal RXEND, based on the comparison with the number of the sent/received bits for one word (for instance, 12 bits). The receipt complete signal RXEND is inputted to a flip-flop FF15. The output of the flip-flop FF15 is inputted to AND gates AND14, AND15 and AND16, to be described later.

On the other hand, the received data (serial input data), and the identification information receipt timing signal IDT are held by two AND gates AND12 and AND13, and a JK flip-flop FF14 as a sample. By this holding, the value of the identification information bit is outputted from the FF14 as a select signal SEL. The identification information bit contained in the received data is "0", if the received data is the control command information, or "1", if the received data is the transition state information or the delay time information. The select signal SEL is inputted to the AND14, AND15 and the AND16.

Moreover, the received data, identification information receipt-timing signal IDT and the select signal SEL are inputted to an AND gate AND17. The inverted signals of the output signal of the AND17 and the select signal SEL are inputted to a JK flip-flop FF16. And, the inverted signal of the output signal from the FF16 is inputted to the AND15. Also, the output signal from the FF16 is inputted to the AND16.

Therefore, when the received data is the control command information, as the value of the select signal SEL becomes "0", only the AND14 outputs "1". Therefore, the receipt complete signal RXEND to be outputted from the FF15 is outputted from the AND14 as a write signal WTa'.

In FIG. 9, when the value of the select signal SEL is "0", a selector 122-2 selects a path A, and the received data stored in a S/P convert data receive section 122-3 is stored in a control command receive register 122-1 through the path A, based on the write signal WTa. Next, the control command information is outputted from the register and supplied to a CPU or a MPU.

(6) Reception of Transition State Information and Delay Time Information

When the data containing the transition state information is received, as the identification information bit becomes "1", the value of the select signal SEL becomes "1". However, at the AND17 shown in FIG. 10, when the first identification information bit "1" is inputted, the value of the select signal SEL is still "0". Therefore, as the output of the FF16 becomes "0", only the AND15 outputs "1". Therefore, the receipt complete signal RXEND to be outputted from the FF15 is outputted from the AND15 as a write signal WTb.

In FIG. 9, when the value of the select signal SEL is "1", the selector 122-2 selects the path B, and the received data stored in the S/P convert data receive section 122-3 is stored in a delay time information receive register 122-5 through the path B, based on a write signal WTc'.

(7) Regeneration of Transition State Information

In FIG. 9, a delay time operation circuit 122-10 performs the operation of a timer setting time td, to be obtained when the transfer time of the transition state information and the delay time information tr (when the transfer time of the data of one word is supposed to be T, the transfer time in this case is T×2) is subtracted from the delay time information td stored in the delay time information receive register 122-5. In short, the timer setting time td is expressed by the following equation:

$$\text{Timer setting time } td = \text{delay time information } tr - (T \times 2) \quad (2)$$

In the above description, at the sending control part 121, the operation of the delay time information tr was performed, however, the delay time information tr can be obtained at the receiving control part 122. In other words, a delay time operation circuit 121-9 of the sending control part 121 performs the operation of the time difference (sending start time ts−state transition time tc) in the above equation (1), and the resultant value is sent as the delay time information. In this case, a send delay time setting register to store the set delay time τ is provided at the receiving control part 122. And, the delay time operation circuit 122-10 of the receiving control part 122 can obtain the timer setting time td, by performing the operation, uniting the equation (1) and the equation (2) together, in short, performing the following equation:

Timer setting time $td=\tau-$(sending start time $ts$–state transition time $tc$)$-(T\times 2)$.

The write signal WTc is supplied to a delay time timer 122-7, delayed for a one-system clock at a flip-flop FF18. By this supply, the operated delay time is set to the delay time timer 122-7. Further, the write signal WTc delayed for one system clock sets a JK flip-flop FF19.

After counting up the set delay time, the delay time timer 122-7 outputs a time up signal TU. By this output, from an AND gate AND18, the write signal WT is supplied to an output register 122-9.

The output register 122-9 connects to a transition state information receive register 122-4, through a decoder 122-8. The decoder 122-8 restores the transition state information encoded by an encoder 121-8 of the sending control part 121. And, by the write signal WT from the AND18, the transition state information restored by the decoder 122-8 is stored in the output register 122-9. And then, the transition state information is outputted from the register as state control signals (A, B, C and D).

As described above, the state control signal corresponding to the state change of the sending side unit is always regenerated at the receiving side unit, when a specified delay time elapsed from the time when any state change occurred at the sending side unit. Therefore, also in transferring the transition state information in serial communication, time relation of occurrence of a state change can be guaranteed, and the state control signal can be regenerated without any time skew.

Figure 11:
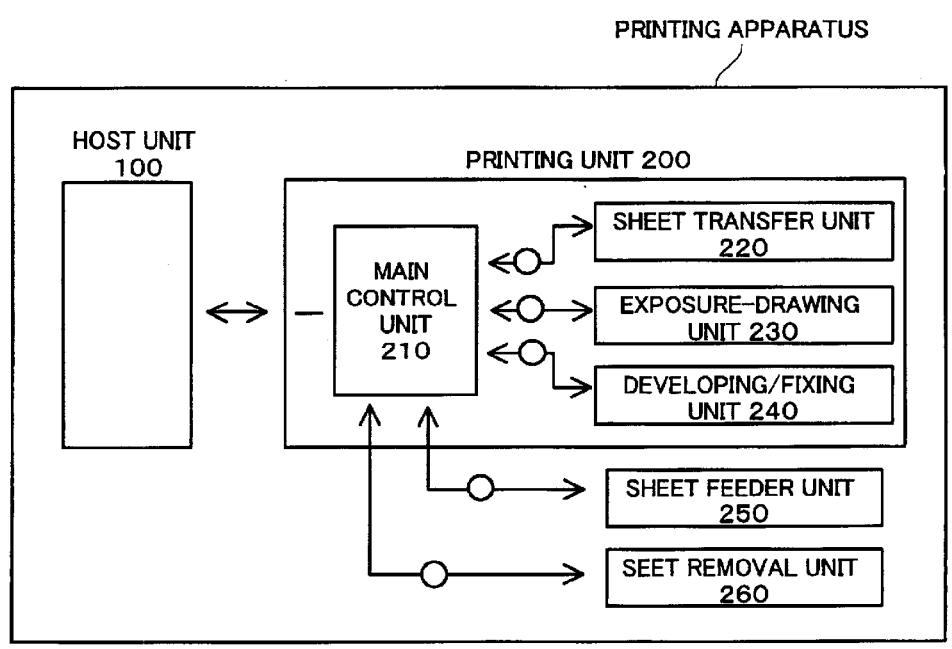
FIG. 11 shows an example of an apparatus applicable to data communication in the embodiment of the present invention.
Figure 12:
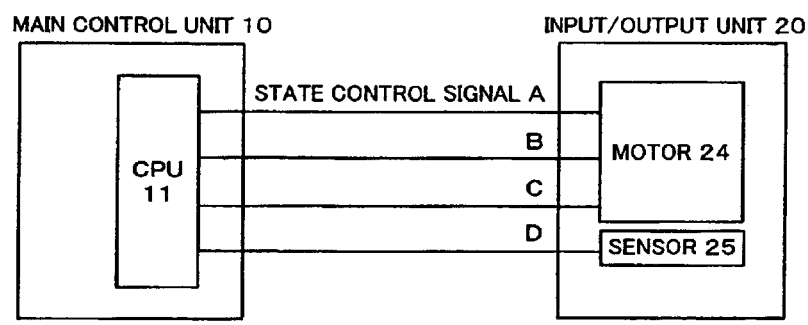
FIG. 12 is an explanatory diagram of communication of a state control signal.
Figure 13:
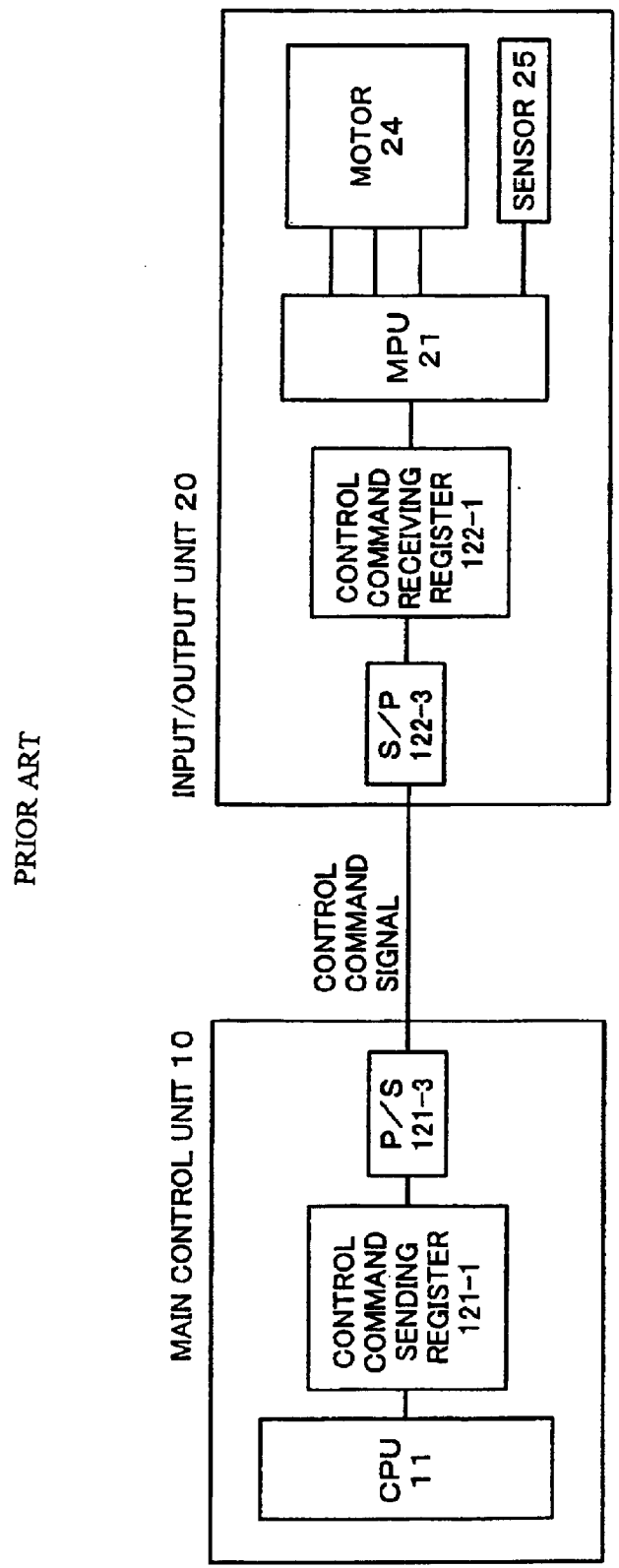
FIG. 13 is an explanatory diagram of communication of a control command signal.

FIG. 11 shows an example of an apparatus, which can apply the data communication method in an embodiment of the present invention. FIG. 11 illustrates about the component units of an apparatus, here, a printing apparatus is taken as one example. The printing apparatus comprises a host unit 100 to control the total printing apparatus, and a printing unit 200. Further, the printing unit 200 includes a printing control unit 210, a sheet transfer unit 220 controlled by the same, an exposure-drawing unit 230, and a developing/fixing unit 240. Further, the printing unit can include a sheet feeder unit 250 and a sheet removal unit 260, and the printing control unit 210 of the printing unit 200 controls these units.

And, for instance, the printing control unit 210 shown in FIG. 11 is applicable to the main control unit 10 (See FIG. 1.) in the embodiment as described above. Also, the sheet transfer unit 220, the exposure-drawing unit 230, the developing/fixing unit 240, the sheet feeder unit 250 and the sheet removal unit 260 are applicable to the input/output unit 20 (See FIG. 1.) in the embodiment as described above.

In embodiments of the present invention, as to a state transition occurred at the sending side unit, the regeneration method of the state transition with a specified delay, by means of sending the transition state information and the delay time information to the receive side unit is previously described, however, the regeneration method is not limited to that as described above. For instance, the state transition can be regenerated at the receive side, by means of using the very time to be regenerated, instead of the delay time information.

Moreover, the state control signal is not limited to a motor drive signal from the CPU11 of the main control unit 10, or a detection signal from the sensor 25 of the input/output unit 20. For instance, an address signal, a data bus signal, or bus control signal from the CPU11 can also be handled as a state control signal.

INDUSTRIAL APPLICABILITY

As described above, according to the present invention, a state change occurred at a send side unit is always regenerated at a receive side unit when a given delay time elapsed from the time at which the state change occurred. Therefore, a state control signal can be sent in real time (without any time skew), by serial communication.

When a send side unit is a main control unit, and a receive side unit is an input/output unit, by the main control unit, the input/output unit will be able to be directly controlled in serial communication. Therefore, unit-to-unit transfer of a multiplicity of control command information can be simplified, thereby contributing to the enhanced reliability of data communication.

In addition, according to the present invention, by serial communication between a send side unit and a receive side unit, both of a state control signal and a control command signal can be sent. In this case, the received data is identified whether that is the data concerning the control command signal, or the data concerning the state control signal. And, if the received data is the data concerning the state control signal, the state control signal is always regenerated at the receive side unit when a given delay time elapsed from the time at which the state change occurred at the send side unit.

The protective scope of the present invention is not limited to the above embodiments, but covers the invention defined by claims and its equivalents.

What is claimed is:

1. A serial data communication method among a plurality of units that make up an apparatus, comprising the steps of:
   detecting a state transition of a state control signal in a first unit;
   sending transition state information corresponding to the state transition from the first unit to a second unit;
   finding in the first unit a time difference between the occurrence time of the state transition and the sending time of the transition state information;
   sending delay time information on the time difference from the first unit to the second unit, following the sending of the transition state information; and
   regenerating the state control signal in the second unit, at the time when a given delay time has elapsed from the occurrence time of the state transition, based on the transition state information and the delay time information received in the second unit.

2. The data communication method according to claim 1, further comprising the step of:
   sending control command information from the first unit to the second unit, wherein
   when the state transition has occurred while the control command information is being sent, the transition state information is sent after completion of the sending of the control command information.

3. The data communication method according to claim 2, further comprising the step of:
   identifying whether the information received in the second unit is the control command information, the transition state information or the delay time information, from identification information added to the received information.

4. A communication control apparatus for controlling serial data communication among a plurality of units that make up an apparatus, the communication control apparatus comprising:

a sending control part disposed in a first unit, the sending control part including a detection section to detect a state transition of a state control signal of the first unit; an operation section to find a time difference between the occurrence time of the state transition and the sending time of transition state information corresponding to the transition state; and a sending section to send the transition state information and delay time information on the time difference to a second unit; and a receiving control part disposed in the second unit, the receiving control part including a receive section to receive the transition state information and the delay time information sent from the first unit; and a regeneration section to regenerate the state control signal in the second unit, at the time when a given delay time has elapsed from the occurrence time of the state transition, based on the delay time information.

5. The communication control apparatus according to claim 4, wherein the sending control part further sends control command information to the second unit, and if the state transition occurs while the control command information is being sent, sends the transition state information after the completion of sending of the control command information.

6. The communication control apparatus according to claim 5, wherein the sending control part adds information for identifying the control command information and the transition state information, to information to be sent, and wherein the receiving control part identifies whether the received information is the control command information or the transition state information, in compliance with the identification information added to the received information.

7. A unit of a plurality of units that make up an apparatus, the units comprising:

a sending control part including a detection section to detect a state transition of a state control signal, an operation section to find a time difference between the occurrence time of the state transition and the sending time of transition state information corresponding to the transition state, and a sending section to send the transition state information and delay time information on the time difference to another unit in serial communication; and a receiving control part including a receive section to receive the transition state information and the delay time information sent from another unit in serial communication, and a regeneration section to regenerate the state control signal when a given delay time has elapsed from the occurrence time of the state transition, based on the delay time information.

8. An apparatus comprising a first unit and a second unit which are connected through a serial communication means, wherein the first unit includes a detection section to detect a state transition of a state control signal, an operation section to find a time difference between the occurrence time of the state transition and the sending time of transition state information corresponding to the transition state, and a sending section to send the transition state information and delay time information on the time difference to the second unit, and wherein the second unit includes a receive section to receive the transition state information and the delay time information sent from the first unit, and a regeneration section to regenerate the state control signal in the second unit when a given delay time has elapsed from the occurrence time of the state transition, based on the received transition state information and delay time information.

* * * * *